March 7, 1939.   L. N. MARKWOOD   2,149,303
LIQUID MEASURING DEVICE
Filed Oct. 13, 1938
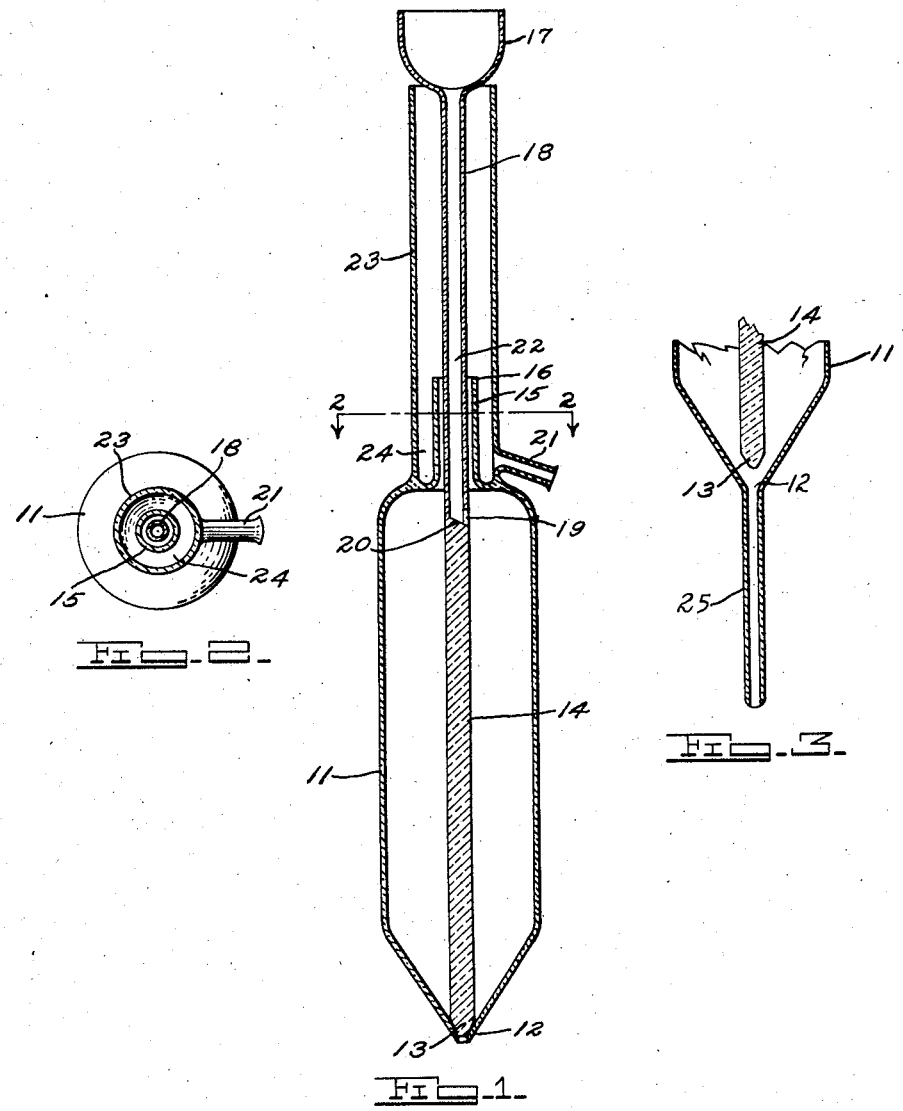
Inventor
L. N. MARKWOOD
Attorney Patented Mar. 7, 1939

2,149,303

UNITED STATES PATENT OFFICE 2,149,303

LIQUID MEASURING DEVICE

Louis N. Markwood, Washington, D. C.

Application October 13, 1938, Serial No. 234,796

4 Claims. (Cl. 73—62)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to a liquid measuring device of the pipette type, characterized by the fact that it is semi-automatic in operation, and that it delivers its rated volume with precision.

One of the objects of this invention is the provision of a device which will obviate the necessity of using the mouth for sucking up liquids as is now customary in many forms of pipettes, thereby eliminating the danger of exposing the mouth to harmful liquids or vapors at the same time preventing contamination of the liquid being measured with saliva from the mouth.

Another object of this invention is to eliminate the use of the human eye, an organ which is easily fatigued, in measuring levels of meniscus, which is uniformly necessary in conventional types of pipettes.

Still another object of this invention is to eliminate the use of the human finger, which is relied upon in many conventional types of pipettes to seal the stem opening to prevent untimely loss of liquid.

A further object of this invention is not only to eliminate the human factor heretofore used with conventional pipettes, namely, the mouth, the eye, and the finger, but also to eliminate moving parts, such as rotating valves, which may require the use of grease for lubrication, because grease is soon dissolved away when working with many organic liquids. This causes sliding parts requiring lubrication to stick and in addition thereto, the liquid being measured becomes contaminated with the grease.

A still further object of this invention is to provide an instrument which will permit the measuring of liquids with great precision, especially those with low viscosity, such as the organic liquids, ether and carbon tetrachloride, which cannot be successfully handled by ordinary pipettes.

The following description, considered together with the accompanying drawing, will disclose this invention more fully, its construction, arrangements, and operations of parts, and further objects and advantages thereof will be apparent.

In the drawing:

Figure 1 is a sectional elevation of an illustrative embodiment of my invention.

Figure 2 is a section along the line 2—2 of Figure 1.

Figure 3 is a fragmentary sectional elevation of the lower part of Figure 1 showing a modified form thereof.

Referring with more particularity to the drawing, in which like numerals designate like parts, the device illustrated comprises a bulb or container section 11 surmounted by a cylindrical tube 23, the bottom of which is turned up to form a short inner tube 15.

On the side of the tube 23 near its junction with the container 11 a tubular outlet 21 is disposed, substantially as shown. The central element 22 is composed of three principal parts, namely, the funnel 17, a narrow tube 18 communicating with said funnel and the rod 14 joined to the lower end of the tube. The tip 13 of rod 14 is ground to a taper and is adapted to removably repose in and seal the outlet 12 in the bottom of the container 11.

The juncture of the tube 18 and the rod 14 is preferably below the top of the container 11 when the taper end 13 is seated in the outlet 12. The plane 20 of this juncture slopes downwardly to an opening 19 in the tube 18. It is preferable for the bottom of the tip 13 to be just short of the bottom of the outlet 12 so that accidental contact from below will not unseat the rod 14.

The operation of this invention is as follows: The central member 22 is positioned as shown in Figure 1 with the tapered point 13 resting in and sealing the outlet 12. The liquid to be measured is then introduced into the funnel 17 from whence it flows down the tube 18 and out of the opening 19 into the container 11. The introduction of the liquid is continued until it fills the container 11 and overflows at the rim 16 of the inner tube 15. The overflowing liquid passes out of the device through the outlet 21 where a container may be placed to catch it. The device can then be transferred to the desired container where the retained liquid can be dispensed by simply elevating the member 22 which has the effect of unseating the tip 13 from the outlet 12 permitting the liquid to flow out by gravity.

In Figure 3 there is illustrated a modified form of this invention, the modification residing in the provision of a long delivery tube 25 at the outlet 12. There are many instances where it is desired to use such a delivery tube. When using this modified form it is preferable to momentarily raise the central element after some liquid has entered the container 11 to permit the tube 25 to become filled with liquid. After reseating the central element, pouring of the liquid is continued. The measured liquid is then dispensed as in the first form of the invention.

Having thus described my invention, I claim:

1. A liquid measuring device comprising a tubular container having an outlet in its bottom; a tube sealed on top of said container; a smaller and shorter tube communicating with said container, secured to the top thereof and disposed in said first-mentioned tube; a central element normally disposed longitudinally through said smaller and shorter tube, said central element having a narrow tube, a rod secured in alignment with said narrow tube on the bottom thereof, the lower end of said rod being adapted to removably rest in and thereby seal the outlet in said container, a funnel disposed on said narrow tube, and an outlet in the bottom of said narrow tube; an overflow in said first-mentioned tube below the upper rim of said smaller and shorter tube.

2. In a liquid measuring device having a tubular container with an outlet in its bottom, a tube sealed on top of said container, a smaller and shorter tube communicating with said container, secured to the top thereof and disposed in said first-mentioned tube and an overflow in said first-mentioned tube below the top of said smaller and shorter tube; a central element longitudinally disposable through said smaller and shorter tube, said central element comprising a narrow tube, a rod secured in alignment with said narrow tube on the bottom thereof, the lower end of said rod being adapted to removably repose in and thereby seal the outlet in said container, a funnel disposed on said narrow tube and an outlet in the bottom of said narrow tube.

3. In a liquid measuring device having a tubular container with an outlet in its bottom, a tube sealed on top of said container, a smaller and shorter tube communicating with said container, secured to the top thereof and disposed in said first-mentioned tube and an overflow in said first-mentioned tube below the top of said smaller and shorter tube; a central element longitudinally disposable through said smaller and shorter tube, said central element comprising a narrow tube, a rod secured in alignment with said narrow tube on the bottom thereof, the lower end of said rod being adapted to removably rest in and thereby seal the outlet in said container, a funnel disposed on said narrow tube and an outlet in the bottom of said narrow tube, the juncture of said narrow tube and rod being below the top of said container and sloping upwardy from the said outlet in the bottom of said narrow tube.

4. A liquid measuring device as defined by claim 1, having a delivery tube secured to the bottom of the tubular container and communicating with the outlet thereof.

LOUIS N. MARKWOOD.